Aug. 12, 1958 — J. W. KOSINSKI — 2,847,225

TOOL HOLDER AND EJECTOR

Filed April 22, 1954

Inventor:
Joseph Kosinski
By Glenn S. Noble, Atty.

United States Patent Office 2,847,225
Patented Aug. 12, 1958

2,847,225

TOOL HOLDER AND EJECTOR

Joseph W. Kosinski, Chicago, Ill., assignor to Scully-Jones and Company, Chicago, Ill., a corporation of Illinois Application April 22, 1954, Serial No. 424,924

1 Claim. (Cl. 279—103)

This invention relates to tool holders or tool holder adapters of the kind commonly in use and which are provided with tapered holes, of any type but preferably of the Morse type, for receiving correspondingly tapered tools, and to means for ejecting the tools from such holders.

The conventional method for removing a taper shank tool from a mating adapter sleeve or spindle is to insert a tapered drift pin into a rectangular slot in the holder which will bear against the top surface of the slot and the end of the tang on the tapered shanks. Then while holding the drift pin in place with one hand, the workman strikes the head of the pin a sharp blow with a hammer which action separates the two mating surfaces and releases the tool.

While such construction and method of removal has been in use for many years, the method is awkward and exposes the adapter sleeve or spindle to abuse from misdirected hammer blows. In addition, the parts being separated are subjected to undesirable shocks due to the hammering and since both hands of the operator are occupied by the drift pin and the hammer, he must resort to awkward and frequently unsuccessful means to catch the tool when it is suddenly ejected from the holder. This exposes the tools to further damage and abuse. When it is realized that an excessive force is required to loosen a tool held by means of a Morse fit, it will be seen that it may be necessary for undue pounding of the drift pin in order to separate such parts. For instance, the force necessary to release a closely fitting No. 2 Morse taper may be approximately 400 pounds.

The principal object of the present invention is to provide a tool holder or adapter with a transverse opening which forms a bearing for the tool ejector, said holder having a substantially rectangular slot along said opening and extending the full length thereof, said slot being of less width than the diameter of the opening and bi-secting the tool receiving hole in the end of the holder, and is to avoid the objections to the previous constructions and eliminate the use of the hammer and the drift pin. Furthermore, the present key slot is easier to manufacture than the conventional rectangular slot previously used and does not materially reduce the holding power or the rigidity of either the tool shank or adapter.

In the accompanying drawings illustrating this invention:

Figure 1:
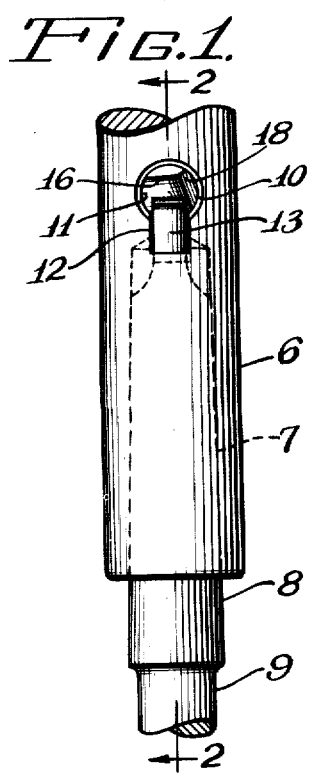
Fig. 1 is a side view of a tool holder such as a spindle or spindle adapter shown with a tool inserted therein, parts being broken away for convenience in illustration.

As shown in these drawings, 6 represents the receiving end of a drill spindle or an adapter such as used with such spindles. The adapter is provided with a tapered hole 7 for receiving the correspondingly tapered end 8 of a tool such as a drill 9. The adapter is provided with a transverse opening 10 in alignment with the socket hole 7. This opening consists of a drilled cylindrical hole 11 of a diameter corresponding to the size of the Morse taper 7 in the adapter. A rectangular slot 12 opens into the lower side of the hole 10 and is of a width corresponding to the width of the tang 13 on the end of the tool or drill 9. The transverse opening is of proper size and location so that when the tapered shank 8 of a tool is securely in place in the adapter, the tang 13 will extend for some distance above the rectangular portion of the slot and into the circular hole or opening as shown in the several figures of the drawings.

The ejector 14 has an engaging portion or section 15 of substantially the same diameter as the cylindrical hole 10, so that when inserted, it will fit closely against the inner walls of the hole and make a particularly substantial bearing for the ejecting purposes.

Figure 2:
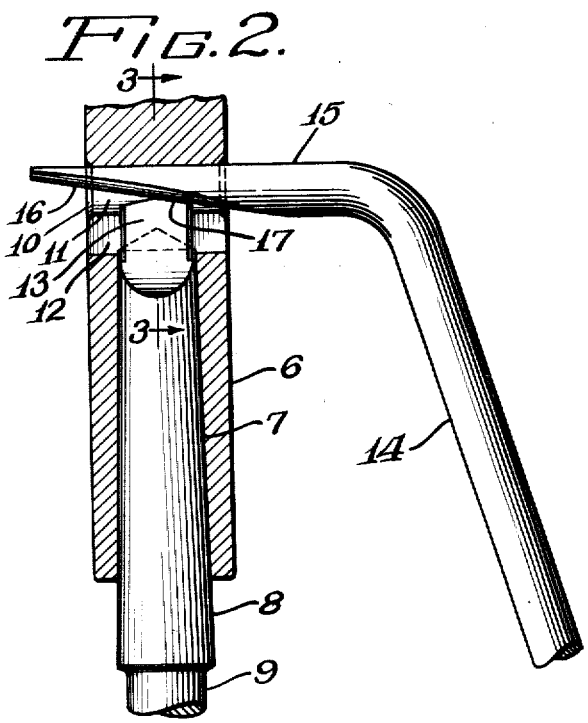
Fig. 2 is a longitudinal sectional view taken substantially on the line 2—2 of Fig. 1, and showing the ejector in position for operation.
Figure 3:
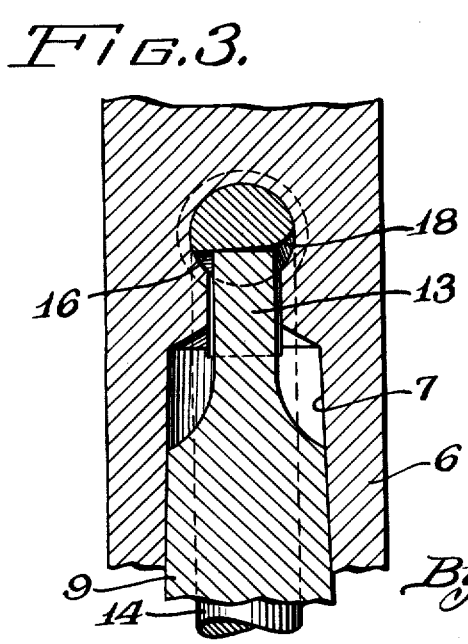
Fig. 3 is an enlarged sectional view taken on the line 3—3 of Fig. 2.

For a short distance along the length of the section at its engaging end, one side is machined flat to provide an engaging surface 16 at somewhat of an acute angle to the center of the rod which angle is complementary to the angle of one side 17 of the tang 13 as best shown in Fig. 2. A portion of the ejector along the side of the flat 16 is curved to form a cam 18 lengthwise of the engaging portion of the ejector. The rod from which the ejector is formed is bent at approximately 90° to the machined end to form a handle by which the ejector is actuated.

Figure 4:
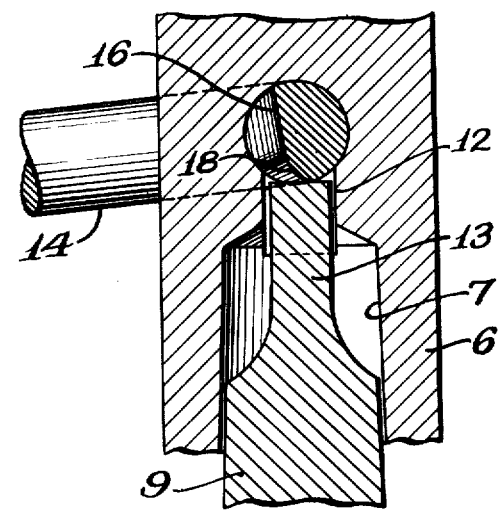
Fig. 4 is a similar view showing the ejector turned for ejecting the tool.

When a drill or tool is to be ejected from a holder, the engaging portion of the ejector is inserted in the hole 10 until the flat strikes the end of the tang 13 as shown in Fig. 2. This is a position ready for ejecting and it will be noted that the ejector has a long bearing within the hole 10 and also has a substantial bearing against the inwardly extending end of the tang. As the handle 14 is swung around, the cam 18 will be forced against the end of the tang with great pressure as shown in Fig. 4 and will cause the tool to be loosened from the socket and ejected from the adapter.

The ejector 14 may be made in various forms and various sizes dependent upon the size of the parts to be disengaged, and the length of the handle may be varied in order to secure the necessary leverage. However, it will be seen that the combination of the relatively long leverage of the handle on the short cam will produce such an increase of force as may be necessary for the purposes described.

Having thus described my invention what I claim is:

A tool ejector for the purposes set forth having a substantially round engaging portion with one side having a flat tapered engaging surface for engagement with the tang of a tool and having a specially formed longitudinal cam merging into said flat side, the lowest portion of the cam being substantially at the center of the tang when in engaging position and gradually increasing in diameter toward the outer periphery of said circular portion, said engaging portion having means for turning the same, the arrangement being such that when the engaging portion is in engagement with the end of the tang and is turned for ejecting the tool, the camming action will occur substantially with the starting of the turning movement and given the greatest leverage for ejecting the tool.

References Cited in the file of this patent

UNITED STATES PATENTS

| 335,184 | Evans | Feb. 2, 1886 |
| 391,038 | Evans | Oct. 16, 1888 |

(Other references on following page)